(12) United States Patent
Jarry-Lacombe et al.

(10) Patent No.: US 10,715,313 B2
(45) Date of Patent: Jul. 14, 2020

(54) SYSTEMS AND COMPUTER-BASED METHODS OF DOCUMENT CERTIFICATION AND PUBLICATION

(71) Applicant: BLOCKCHAIN CERTIFIED DATA SAS, Rueil Malmaison (FR)

(72) Inventors: Luc Jarry-Lacombe, Rueil Malmaison (FR); Vincent Langard, Juvignac (FR)

(73) Assignee: BLOCKCHAIN CERTIFIED DATA SAS, Rueil Malmaison (FR)

(*) Notice: Subject to any disclaimer, the term of this patent is extended or adjusted under 35 U.S.C. 154(b) by 162 days.

(21) Appl. No.: 16/138,082

(22) Filed: Sep. 21, 2018

(65) Prior Publication Data
US 2020/0099511 A1     Mar. 26, 2020

(51) Int. Cl.
*H04L 9/06* (2006.01)
*G06F 21/60* (2013.01)
(Continued)

(52) U.S. Cl.
CPC .......... *H04L 9/0637* (2013.01); *G06F 21/602* (2013.01); *H04L 9/0631* (2013.01);
(Continued)

(58) Field of Classification Search
CPC .................................................. H04L 9/0637
See application file for complete search history.

(56) References Cited

U.S. PATENT DOCUMENTS

| 9,774,578 B1* | 9/2017 | Ateniese | H04L 9/085 |
| 2006/0126835 A1* | 6/2006 | Kim | H04L 9/0637 |
| | | | 380/44 |

(Continued)

FOREIGN PATENT DOCUMENTS

WO    WO-2017090041 A1 *  6/2017   ......... H04L 63/0428

OTHER PUBLICATIONS

Satoshi Nakamoto, "Bitcoin: A Peer-to-Peer Electronic Cash System", 9 pages, published: 2018. (Year: 2018).*

(Continued)

*Primary Examiner* — Ponnoreay Pich
(74) *Attorney, Agent, or Firm* — Jon E. Gordon; Haug Partners LLP

(57) ABSTRACT

A method is implemented in a networked computer system that is connected to document issuers and validators and interacts with a blockchain. It comprises generating a master key assigned to an issuer, certifying a document through a first process including generating a document persistence key, encrypting document data with an encryption algorithm and an encryption key derived from three keys (the master key, the document persistence key and an intermediate key), registering encrypted document data in the blockchain, and generating a web address carrying recovery information of the certified document; reading the document through a second process accessible to the web address, the second process including recovering the encrypted data in the blockchain and accessing the three keys, decrypting the encrypted data using the encryption key derived from the three keys, and displaying the document; and upon request from a legitimate holder of the document erasing the persistence key.

19 Claims, 8 Drawing Sheets

(51) Int. Cl.
*H04L 9/08* (2006.01)
*H04L 9/32* (2006.01)

(52) U.S. Cl.
CPC .......... *H04L 9/0861* (2013.01); *H04L 9/0894* (2013.01); *H04L 9/3218* (2013.01); *H04L 2209/38* (2013.01)

(56) References Cited

U.S. PATENT DOCUMENTS

| | | | |
|---|---|---|---|
| 2017/0149560 A1* | 5/2017 | Shah | G06K 7/1417 |
| 2017/0366353 A1* | 12/2017 | Struttmann | G06F 21/64 |
| 2018/0227293 A1* | 8/2018 | Uhr | G06Q 20/3821 |
| 2018/0268504 A1* | 9/2018 | Paolini-Subramanya | G06Q 50/167 |
| 2018/0294977 A1* | 10/2018 | Uhr | G06Q 20/38215 |
| 2019/0164220 A1* | 5/2019 | Raj | G06Q 40/02 |
| 2020/0099511 A1* | 3/2020 | Jarry-Lacombe | H04L 9/0631 |

OTHER PUBLICATIONS

PCT Written Opinion of the International Searching Authority for International Application No. PCT/EP2019/075505, 6 pages, dated Mar. 26, 2020 (Year: 2020).*

Vitalik Buterin, "Ethereunn White Paper, A Next Generation Smart Contract & Decentralized Application Platform", 36 pages, published: 2017. (Year: 2017).*

Gavin Wood, "Ethereunn: A Secure Decentralized Generalized Transaction Ledger", 32 pages, published: 2014. (Year: 2014).*

* cited by examiner

FIG. 7

SYSTEMS AND COMPUTER-BASED METHODS OF DOCUMENT CERTIFICATION AND PUBLICATION

TECHNICAL OVERVIEW

The technology herein relates to computer systems and computer-based methods designed to guarantee the authenticity and integrity of documents, such as academic documents and diplomas, but also civil status, official documents and other sensitive documents. More particularly, the technology herein relates to computer systems and processes which associate a blockchain with a high level of cryptography to certify documents in a secure and sustainable way, in compliance with the regulation on personal data and the right to be forgotten.

Introduction

Nowadays, in a digital and networked society, guarding against falsification of documents is an increasingly critical necessity. Many sectors, institutions and organizations face the scourge of document falsification. For example, the fraudulent use of fake diploma, or made-up qualifications on resumes and social media is a hard fact impacting schools, universities, graduates and employers. Diplomas issued from schools, universities that do not exist and high-quality replica diplomas from real educational institutions can be purchased on websites. This is a major issue for companies who rely on the veracity of data provided by their employees. This is a major issue for the actors of the educational and training system which have to defend their integrity.

Being able to prove in a simple and irrefutable way, ideally by a simple click, that one is graduated from a university, qualified doctor or holder of a driving license, for example, is a very current societal need.

Thus, modern certification systems adapted to the digital environment and social networks will find numerous applications as in the certification of professional skills, registers of regulated professions, internal business registers, administrative registers and others.

Blockchain technology has been proposed for document certification systems.

Blockchain technology, simply called "blockchain", has been described for the first time by Satoshi Nakamoto in the paper "Bitcoin: A Peer-to-Peer Electronic Cash System" published in 2008 and whose entire contents are hereby incorporated by reference. A blockchain is a data structure that stores a list of transactions and can be thought of as a distributed electronic ledger that records transactions which are bundled into blocks linked in a chain. Computer nodes maintain the blockchain and cryptographically validate each new block, and the transactions contained in the block, with a protocol so-called "proof-of-work".

The Holberton School in San Francisco (USA) and the ESILV engineering school in Paris (France) have both established a diploma certification based on a storage of a diploma imprint in a public blockchain. A so-called "hash function" is used to produce the diploma imprint. This method guarantees the authenticity of the diploma initially hashed, but raises the following issues:

1) The identity of the diploma issuer is not proven, and the authenticity of data is not certified. Indeed, how to be sure that the hashed diploma is the original one and was really issued by the school?

2) The diploma imprint is stored in the blockchain forever, and, once shared, the diploma stays recognizable forever.

Item 2) is problematic for compliance with the regulation on personal data and the right to be forgotten, in particular, the European regulation known by acronym "GDPR", for "General Data Protection Regulation", in effect since May 25, 2018.

In a press release "*Sony® and Sony Global Education Develop a New System to Manage Students' Learning Data, Built on IBM Blockchain*", Aug. 9, 2017, International Business Machines Corporation® has announced a new platform, developed using the blockchain of IBM®, to secure and share school credentials. A private blockchain and a proprietary software will be implemented in this platform.

The present invention aims to provide a solution to the above-mentioned problems of the current situation. Specifically, it is desirable to provide a document certification system compliant with regulation on personal data, with a low cost-in-use for document issuers, and based on an open technology that facilitates trust and collaboration of various actors and protagonists of the system.

SUMMARY

According to a first aspect, the invention provides a computer-based method implemented in a document certification computer system deployed through the internet network and which interacts with a public blockchain, the document certification computer system having hardware and software resources located in at least one computer server and which are accessible through the internet network, the document certification computer system communicating via electronic data messages with at least one document issuer computer system through which a document issuer manages issuances of certified documents and at least one validator computer system through which a validator manages access rights and resources allocated to a document issuer account of the document issuer, the computer-based method comprising:

generating an issuer permanent master key which is assigned to the document issuer account and stored in a first key vault, certifying and publishing a document through an execution of a first process including generating a document persistence key which is assigned to the document and stored in a second key vault, rights to permanently erase the document persistence key being assigned to the document issuer account, encrypting document data with an encryption algorithm and an encryption key which is calculated by a key derivation function from the issuer permanent master key, the document persistence key and an intermediate key which is generated and assigned to the document, registering information including encrypted document data in the blockchain, and generating a document web address of a corresponding published certified document, the web address carrying recovery information of the document intermediate key and identification data of the published certified document, reading the published certified document through an execution of a second process which is accessible to the web address, the second process including recovering, from the identification data, the encrypted document data in the information registered in the blockchain and an access to the first and second key vaults, calculating the encryption key with the key derivation function from the issuer permanent master key, the document persistence key and the intermediate key recovered from the web address, decrypting the encrypted document data using the encryption key and displaying the certified document using the decrypted document data, and upon request from a legitimate holder of the published certified document, claiming a right to be forgotten, operating from the document issuer account a permanent erasure of the document persistence key, thereby rendering inoperative the execution of the second process and a display of the published certified document in the internet network.

It will be appreciated that unlike the prior art which is based on the use of a hash function to certify documents, the present invention certifies the authenticity of the data and reconstructs the documents from the authenticated data.

In one implementation of the computer-based method of the invention, the first key vault is implemented in a hardware security module.

In another implementation of the computer-based method of the invention, the first and second key vaults are implemented in a hardware security module.

According to another characteristic of the computer-based method of the invention, the encryption algorithm is an encryption algorithm of AES type, the encryption key being symmetric and having a length of 256 bits.

According to yet another characteristic of the computer-based method of the invention, the encryption algorithm operates in a counter mode of GCM type.

According to yet another characteristic of the computer-based method of the invention, the key derivation function is a key derivation function of KBKDF type.

In yet another implementation of the computer-based method according to the invention, the document data comprises predetermined specific data, the predetermined specific data being variable data in a document category to which pertains the document, and the first process further includes associating with the predetermined specific data a template identifier of a HTML template corresponding to the document category and including the template identifier in the information registered in the blockchain, and the second process further includes recovering the template identifier in the information registered in the blockchain from the identification data and displaying the certified document using the decrypted document data and the HTML template recovered using the template identifier.

According to an additional characteristic of the computer-based method of the invention, the second process further includes recovering authenticity proofs of the issuer and/or validator, the authenticity proofs having been previously registered in data storage in the blockchain and being localized using at least the identification data, and displaying the certified document using the authenticity proofs.

According to another characteristic of the computer-based method of the invention, the document data are in the form a text file, the text file includes a batch of plural predetermined specific data arranged in a predetermined manner and pertaining respectively to plural documents.

According to yet another characteristic of the computer-based method of the invention, the predetermined specific data are written in one or plural languages.

According to yet another characteristic, the computer-based method of the invention comprises generating at least one document web address corresponding to one certified document published in plural languages.

According to another aspect, the invention provides a document certification computer system deployed through the internet network and which interacts with a public blockchain, the document certification computer system having hardware and software resources located in at least one computer server and which are accessible through the internet network, the document certification computer system communicating via electronic data messages with at least one document issuer computer system through which a document issuer manages issuances of certified documents and at least one validator computer system through which a validator manages access rights and resources allocated to a document issuer account of the document issuer, the computer server comprising a processor, non-volatile and volatile work memories and being coupled to electronic data storage, where the processor is configured to perform:

generating an issuer permanent master key which is assigned to the document issuer account and stored in a first key vault, certifying and publishing a document through an execution of a first process including generating a document persistence key which is assigned to the document and stored in a second key vault, rights to permanently erase the document persistence key being assigned to the document issuer account, encrypting document data with an encryption algorithm and an encryption key which is calculated by a key derivation function from the issuer permanent master key, the document persistence key and an intermediate key which is generated and assigned to the document, registering information including encrypted document data in the blockchain, and generating a document web address of a corresponding published certified document, the web address carrying recovery information of the document intermediate key and identification data of the published certified document, reading the published certified document through an execution of a second process which is accessible to the web address, the second process including recovering, from the identification data, the encrypted document data in the information registered in the blockchain and an access to the first and second key vaults, calculating the encryption key with the key derivation function from the issuer permanent master key, the document persistence key and the intermediate key recovered from the web address, decrypting the encrypted document data using the encryption key and displaying the certified document using the decrypted document data, and upon request from a legitimate holder of the published certified document, claiming a right to be forgotten, operating from the document issuer account a permanent erasure of the document persistence key, thereby rendering inoperative the execution of the second process and a display of the published certified document in the internet network.

According to an additional characteristic of the system of the invention, the computer server comprises a hardware security module which is coupled to the hardware processor, at least the first key vault being implemented in the hardware security module.

According to another characteristic of the system of the invention, the encryption algorithm is an encryption algorithm of AES type, the encryption key being symmetric and having a length of 256 bits.

According to yet another characteristic of the system of the invention, the encryption algorithm operates in a counter mode of GCM type.

According to yet another characteristic of the system of the invention, the key derivation function is a key derivation function of KBKDF type.

In one embodiment of the system according to the invention, the document data comprises predetermined specific data, the predetermined specific data being variable data in a document category to which pertains the document, and the first process further includes associating with the predetermined specific data a template identifier of a HTML template corresponding to the document category and including the template identifier in the information registered in the blockchain, and the second process further includes recovering the template identifier in the information registered in the blockchain from the identification data and displaying the certified document using the decrypted document data and the HTML template recovered using the template identifier.

According to an additional characteristic of the document certification computer system of the invention, the second process further includes recovering authenticity proofs of the issuer and/or validator, the authenticity proofs having been previously registered in data storage in the blockchain and being localized using at least the identification data, and displaying the certified document using the authenticity proofs.

According to another characteristic of the system of the invention, the document data are in the form a text file, the text file includes a batch of plural predetermined specific data arranged in a predetermined manner and pertaining respectively to plural documents.

According to yet another characteristic of the system of the invention, the predetermined specific data are written in one or plural languages.

According to yet another characteristic, the system of the invention comprises generating at least one document web address corresponding to one certified document published in plural languages.

These few characteristics will make apparent to the skilled person the advantages of the invention over the prior art.

BRIEF DESCRIPTION OF THE DRAWINGS

The above-mentioned and other features and advantages of the invention will be better and more completely understood by referring to the following detailed description of example non-limiting illustrative embodiments in conjunction with the accompanying drawings wherein reference numerals refer to identical or functionally similar elements throughout the separate figures. It should be noted that the drawings serve solely to illustrate the text of the description and to explain various principles and advantages of the invention, and do not in any way constitute a limitation upon the scope of the invention. In the accompanying drawings:

FIGS. 7-9 illustrate various no-limiting files of document specific data corresponding to various example embodiments of the document certification system and which are processed according to the computer-based method of the invention.

DETAILED DESCRIPTION

In the following description, for purposes of explanation and non-limitation, specific details are set forth, such as particular functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 1:
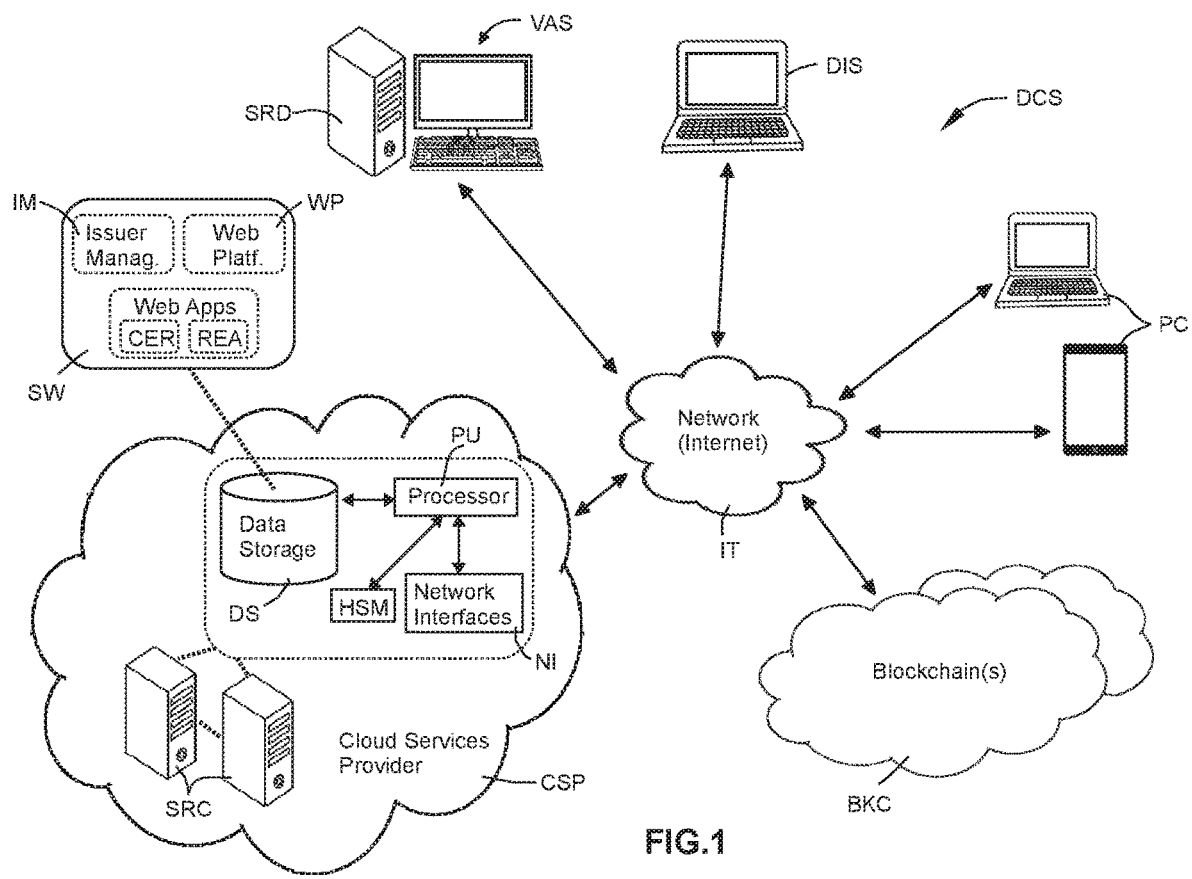
FIG. 1 is a non-limiting example overview of a computer system which interfaces with a blockchain and in which an example embodiment of the document certification system of the present invention is implemented.

Referring to FIG. 1, in a document certification computer system DCS according to the invention, different computer systems and devices communicate and interact by exchanging electronic data messages through the internet network IT. Thus, document issuing entities and at least one validating entity are connected to the document certification computer system DCS through their computer systems or devices, namely, VAS and DIS in FIG. 1, respectively. Users, to whom are intended certified documents, such as diplomas, can view these documents on computers, tablets and/or smartphones PC. A user is, for example, a graduate who visualizes his diploma by means of an "URL" (acronym of «Uniform Resource Locator), called also "web address" hereinafter, or an employer who checks validity of an applicant diploma for a job, with a diploma web address which was communicated to him by the applicant.

In particular, the validating entities, which are simply called "validators" hereinafter, are responsible for carrying out KYC/KYB checks (acronym of «Know Your Customer"/"Know Your Business") prior to creating and installing accounts for the document issuing entities.

The document issuing entities, referred to as "issuers" hereinafter, are the customers of the document certification computer system DCS. In the non-limiting example that is considered here, the issuers are schools and the documents are diplomas issued by these schools.

The document certification computer system DCS is deployed through the Internet network IT and interacts with one or plural blockchains BCK. The document certification computer system DCS use hardware and software resources which are accessible through the network IT.

In the example embodiment shown in FIG. 1, the document certification computer system DCS uses software and hardware resources available in a cloud services provider SCP.

In this example, the system software SW of the system DCS is hosted entirely in at least one computer server SRC of the cloud services provider SCP. Specifically, the system software SW is hosted in a dedicated electronic data storage DS such as hard-drive(s). The computer-based method of the invention is implemented in particular by the execution of code instructions of the system software SW.

The computer server SRC comprises a hardware processor PU including one or more processing units CPU and associated with non-volatile and volatile memories (e.g., ROM and RAM) and coupled to the electronic data storage DS and conventional hardware devices such as network interfaces NI and other devices (not shown).

An optional hardware security module, so-called HSM by those skilled in the art, is shown in FIG. 1. In the present invention, and as will become clearer later, this hardware security module is dedicated to the system DCS and may be used for at least one key vault.

The system software SW includes various software modules IM that perform KYC/KYB check out, installation, and management of the document issuer accounts. The system software SW implements in particular a web platform WP on which validators and issuers can securely access their respective accounts and use the system DCS. The system software SW includes also web applications, CER and REA, that support document certification and publication and reading processes, respectively.

It will be noted that in other example embodiments, the system DCS may be installed in one or more dedicated validator servers SRD and use software and hardware resources thereof. Or, as another example, the system DCS may be installed partly in one or more servers SRC of the cloud services and partly in one or more dedicated servers SRD of validator(s).

Regarding the blockchain BKC, it should be noted that the environment of this blockchain must make it possible to program so-called "smart contracts", i.e., programs written in the blockchain and executed by a virtual machine. The blockchain environment must therefore provide a set of computational instructions adapted to program these smart contracts in the blockchain. For example, one blockchain environment suitable for the implementation of the system DCS of the present invention is the Ethereum environment. The papers "Ethereum: A Next-Generation Generalized Smart Contract and Decentralized Application Platform" (Vitalik Buterin, Ethereum, 2017) and "Ethereum: A Secure Decentralized Generalized Transaction Ledger" (Gavin Wood, Ethereum, 2014) provides detailed descriptions of this technology, the entire contents of which being hereby incorporated by reference.

It should be noted that the system DCS may interact with one or more blockchains BKC. The terms "blockchain BKC" used in this patent application must therefore be interpreted broadly. Thus, for example, a first blockchain can be used for encrypted data storage and a second blockchain can be used for hosting smart contracts dedicated to authentication and writing rights management. Or, a single blockchain supporting smart contracts can be used for all required operations.

Costs are involved in establishing smart contracts and writing in the blockchain BKC. The computer-based method according to the invention is designed to minimize these costs.

In a preferred non-limiting implementation, all data of a certified document are not registered in the blockchain BKC. Only specific data identifying the document and which vary from one document to another same-type document sent by an issuer are encrypted before being registered in the blockchain BKC, with a template identifier. Static template data can also be registered in the blockchain BKC and be certified but not encrypted.

Figure 2:
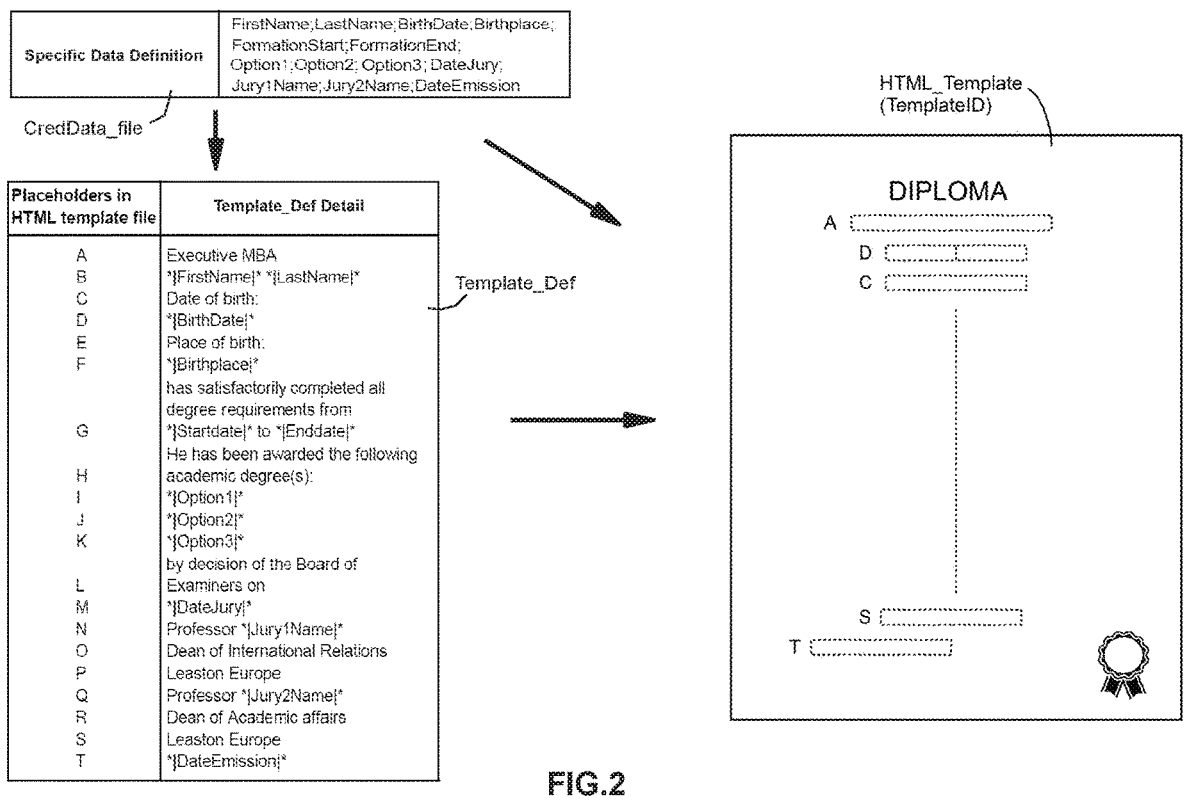
FIG. 2 is an non-limiting illustrative diagram of various data files involved in the display of a certified document in one example implementation of the computer-based method of the invention.

An illustrative example of the above operations is shown in FIG. 2. In this non-limiting example, the certified document, in the form of a diploma, is reconstituted from three files HTML_Template, Template_Def and CredData_file.

The file HTML_Template is a template in hypertext HTML format of the certified document. The file HTML_Template has an identifier TemplateID. The file HTML_Template has a plurality of data-entry fields, labelled A to T, whose places in the document are defined by tags/placeholders in the file HTML_Template.

The file Template_Def defines the data to be entered in the data-entry fields A to T of the file HTML_Template. The data to be entered in the fields A to T are of a "fixed" type or a "variable" type. The fixed-type data (for example, "Executive MBA", corresponding to the field A) are defined directly in the file Template_Def. The variable-type data (for example, "FirstName", "LastName", corresponding to field B) are document specific data CredData that are contained in clear text in the file CredData_file. For variable-type data, identifiers (for example, "|FirstName|", "|LastName|", corresponding to field B) are included in the file Template_Def to indicate the corresponding data in the file CredData_file to be inserted into the HTML file.

The computer-based method of the invention thus allows a complete and rich visualization of the certified document, while minimizing the costs related to the blockchain BKC. Only the document specific data CredData are encrypted before being registered in the blockchain BKC. Eventually, the data CredData are compressed before registering them in the blockchain BKC, further minimizing the costs. The identifier TemplateID is registered with the document specific data CredData and identifies the files HTML_Template and Template_Def. The file Template_Def can also be registered once in the blockchain BKC and will be used for many same-category certified documents. The HTML_Template file can be stored in the dedicated electronic data storage DS (FIG. 1).

Figure 3:
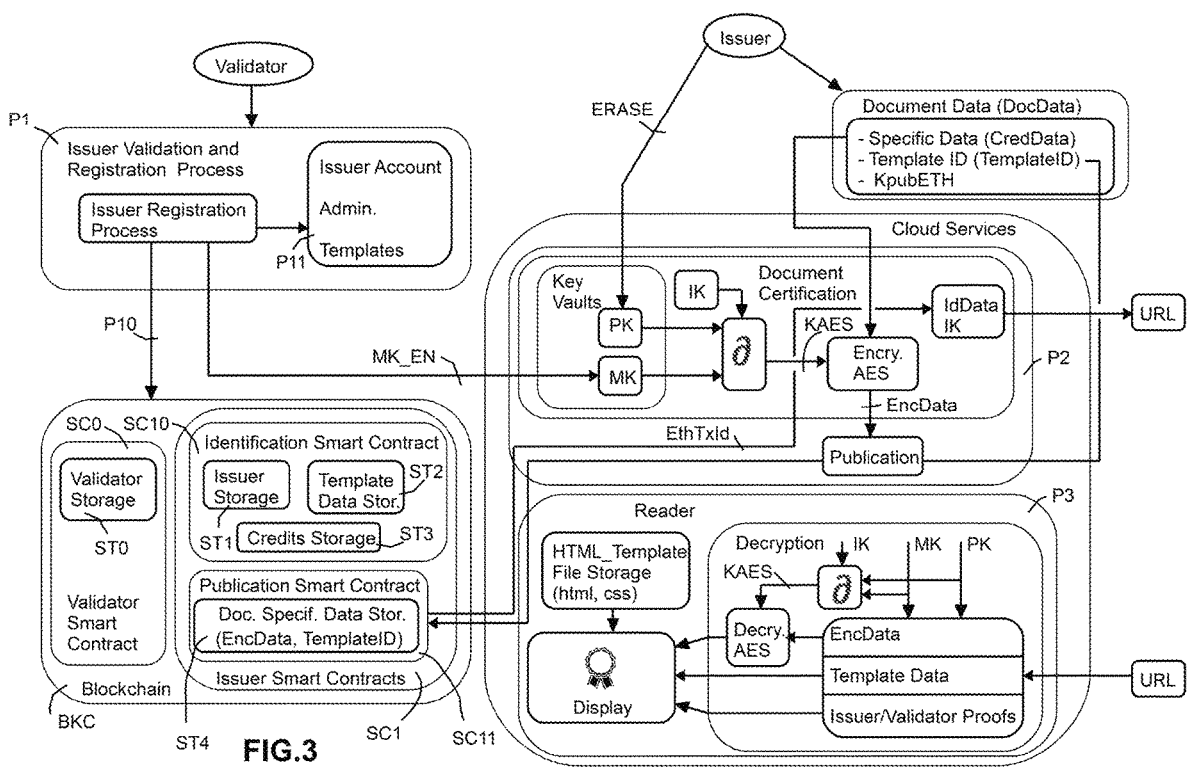
FIG. 3 is a non-limiting example block diagram of various processes implemented in the example embodiment of FIG. 1.

The block diagram of FIG. 3 shows schematically various functions and processes performed in the system DCS of the invention.

As shown in FIG. 3, the system DCS comprises a process P1 for validation and registration of issuers. The process P1 is executed by the validator. At the beginning of the process P1, various legal documents and proofs of the issuer authenticity are collected and stored.

After the KYC/KYB check is complete, the validation and registration process P1 authorizes the execution of following processing steps P10 to organize a data structure based on smart contracts in the blockchain BKC and in security areas of data storage. Other processing steps P11 are also executed during the validation and registration process P1 to create accounts attached to the validated issuer (blockchain account and web platform account), register an administrator with a granted login and allow creation and management operations of templates for the publication of certified documents. In addition, an authorization MK_EN for the generation of a secret master key MK for the issuer is given by the validator at the end of the validation and registration process P1. This master key MK is generated and is stored in a key vault, as shown in FIG. 3. The master key MK is a permanent secret key attached to the issuer account. This master key MK is used to encrypt/decrypt document data for the publication of the certified documents. In particular embodiments, the key vault of the master key MK will be implemented in the above-mentioned hardware security module HSM (see FIG. 1).

Once the issuer blockchain account is created (with an associated address and a private key), a validator smart contract SC0, associated with the issuer account, and issuer smart contracts SC1 are registered in the blockchain BKC.

The validator smart contract SC0 manages in particular a validator data storage ST0 in which the identification data of the issuer are registered.

Figure 6:
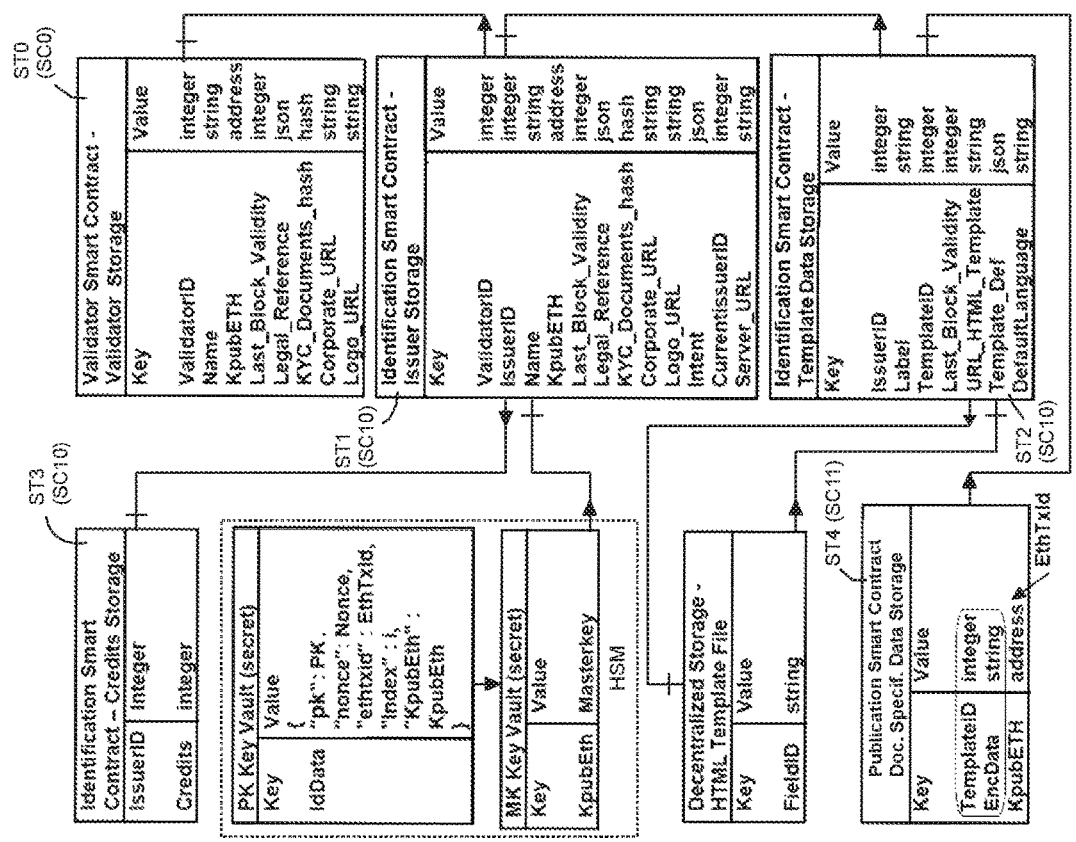
FIG. 6 illustrates a non-limiting data structure deployed in an example embodiment of the document certification system of the present invention.

Referring also to FIG. 6, the validator data storage ST0 comprises in particular a validator identifier ValidatorID, as an integer, the issuer name in the form of a character string, or shortly string, a blockchain account address KpubETH of the issuer account, un identifier, as an integer, of the last valid block Last_Block_Validity in the blockchain, a legal reference file Legal_Reference of the issuer, in the format called "json" (acronym of «JavaScript Object Notation"), a KYC/KYB document hash KYC_Documents_hash, a web address Corporate_URL of the issuer website, as a string, and a web address Logo_URL of the issuer logo, as a string.

As shown in FIG. 3, issuer smart contracts SC1 include an identification smart contract SC10, and a publication smart contract SC11 intended in particular for the management of encrypted data of the certified document published by the issuer. The identification smart contract SC10 manages in particular data storages ST1, ST2 and ST3, and the publication smart contract SC11 manages in particular a data storage ST4.

Referring also to FIG. 6, the data storages ST1, ST2 and ST3 are respectively dedicated to issuer identification data, template data and data of credits available for payment of incurring fees (in particular, for the transaction costs on the blockchain BKC). The data storage ST4 is dedicated in particular to the registration of the encrypted specific data of the certified document.

As shown in FIG. 6, the issuer identification data storage ST1 includes in particular the validator identifier ValidatorID, an issuer identifier IssuerID, as an integer, the issuer name, the blockchain account address KpubETH, the identifier of the last valid block Last_Block_Validity, the legal reference file Legal_Reference, the KYC/KYB document hash KYC_Documents_hash, the web address Corporate_URL of the issuer website, the web address Logo_URL of the issuer logo, an intent file, as a json-type file, an identifier CurrentissuerID of the connected issuer, as an integer, and a web address Server URL of a server of the issuer, as a string.

The duplication of the identification data in data storages ST0 and ST1, such as ValidatorID, Name, KpubETH, Last_Block_Validity, Legal_Reference, KYC_Document_hash, Corporate_URL and Logo_URL data, makes it possible to check the validity of an issuer account during certain transactions deemed critical and to validate issuer and/or validator authenticity proofs that can be made available when displaying the certified document.

The template data storage ST2 includes the issuer identifier IssuerID, a template identifier TemplateID, as an integer, the last valid block Last_Block_Validity, a web address URL_HTML_Template, as a string, of the hypertext file HTML_Template which is the HTML template corresponding to the published certified document, the template definition file Template_Def, as a json-type file, and an identifier DefaultLanguage that informs of a language to be used by default for the published certified document.

The credit data storage ST3 includes the identifier IssuerID and a credit amount Credits. For example, the credit amount can be indicated in tokens. In the case of the use of tokens, the operation of the account may in particular be designed so that the tokens are completely transparent for the user who manipulates only legal fiduciary currencies.

As also shown in FIG. 6, the data storage ST4, managed by the publication smart contract SC11, includes encrypted data EncData resulting of the encryption of document specific data CredData and the TemplateID identifier of the HTML template for the published certified document, as well as the blockchain account address KpubETH.

Referring again to FIG. 3, the system DCS also includes a document certification and publication process P2 and a certified document reading process P3. These processes P2 and P3 are implemented in particular by the web applications CER and REA, above-mentioned in relation to FIG. 1. The processes P2 and P3 use for their operations the secure environment provided by key vaults, as well as the smart contracts and the registrations in the blockchain BKC. According to the embodiments of the invention, it can be used key vaults implemented by software and/or hardware.

Figure 4:
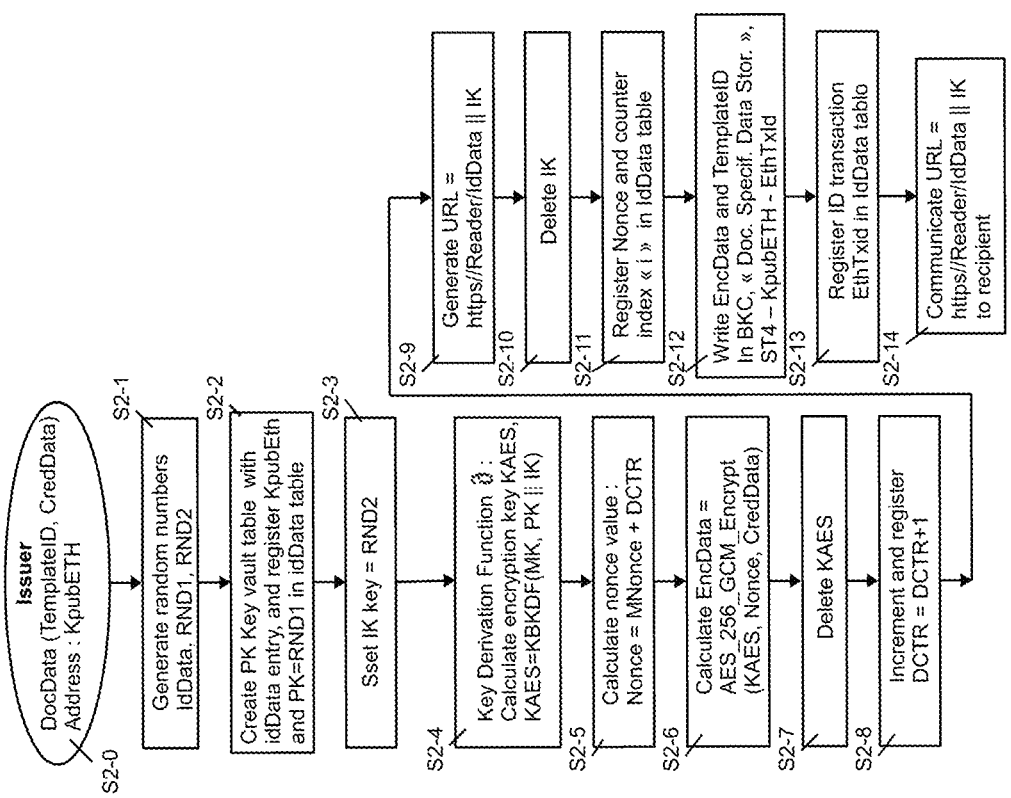
FIG. 4 is a non-limiting example function algorithm of a document certification and publication process implemented in the computer-based method of the invention.

Referring also to FIG. 4, the document certification performed in the process P2 uses an encryption algorithm that requires three keys, namely, the permanent master key MK, a persistence key PK which is attached to the document and an intermediate key IK also dedicated to the document. In a particular implementation, the keys MK and PK are both safely stored in software key vaults. In another particular implementation, the key MK is stored in the hardware security module HSM for an enhanced security and the key PK is stored in a software key vault. In yet another particular implementation, the keys MK and PK are both stored in the hardware security module HSM.

Preferably, the keys MK, PK and IK will be generated by a high-performance random number generator, for example, a high-performance random number generator included in the hardware security module HSM if applicable.

The persistence key PK may be erased by the issuer upon a request from a document legitimate holder, claiming his "right to be forgotten", and/or by the document legitimate holder to whom an erasing authorization code, for example a unique code, has been assigned by the system DCS. Deletion of the persistence key PK makes it impossible for the process P3 to read the published certified document, as will become clearer hereinafter.

FIG. 4 completes the simplified block diagram of FIG. 3, by showing in detail different processing steps S2-0 to S2-14 which are performed by the process P2.

At the beginning of the document certification, at step S2-0, the issuer system DIS (FIG. 1) initially provides the process P2 with document data DocData including the document specific data CredData and the identifier TemplateID, as well as the blockchain account address KpubETH.

In a step S2-1, three random data IdData, RND1 and RND2 are generated by the random number generator. In step S2-2, a key vault table identified by IdData is created. The persistence key PK, to which random data RND1 is assigned, and the blockchain account address KpubETH are registered in the key vault IdData. In step S2-3, the random data RND2 is assigned to the intermediate key IK.

In step S2-4, an encryption key KAES is calculated with a key derivation function a from the keys MK, PK and IK. The encryption key KAES is intended to be used for the encryption of the document specific data CredData.

For example, a key derivation function of type KBKDF (acronym of «Key-Based Key Derivation Function") may be used for the key derivation function a. The calculated encryption key KAES is then: KAES=KBKDF (MK, PK∥IK).

In step S2-5, an additional random data, called "nonce" in the art and designated here Nonce, is calculated by adding the value of a derivation counter DCTR to a master nonce MNonce (random data).

In step S2-6, in this example embodiment, a symmetric encryption algorithm AES (acronym of "Advanced Encryption Standard") is used to encrypt the document specific data CredData. Specifically, in this example embodiment, the encryption algorithm is used in a counter mode, namely, the counter mode so-called GCM (acronym of «Galois/Counter Mode") and the encryption key has a length of 256 bits. The CredData, MK, IK, and Nonce entries are provided to the encryption algorithm AES_256_GCM_Encrypt, which delivers the encrypted document specific data EncData.

In steps S2-7 and S2-8, the encryption key KAES is erased from the working memory and the derivation counter DCTR is incremented and stored in a register, respectively.

In step S2-9, it is generated a web address, «URL=https//Reader/IdData||IK», for the certified document. The necessary information for an access to the table IdData and the intermediate key IK is integrated in this web address «URL=https//Reader/IdData||K». This web address leads to the web application REA which implement the certified document reading process P3.

In steps S2-10 and S2-11, the intermediate key IK is erased from the working memory and the random data Nonce and a counter index "i" are stored in the table IdData.

In step S2-12, a transaction is performed to publish the encrypted document specific data EncData and the template identifier TemplateID in the blockchain BKC. The blockchain account address KpubETH is used for this transaction. The registration of this transaction in a block of the blockchain BKC corresponds to the document specific-data storage ST4 described above in relation to FIGS. 3 and 6. With the transaction identifier EthTxId, also shown in FIG. 6, the transaction can be found in the blockchain BKC and EncData and TemplateID can be retrieved.

In step S2-13, the transaction identifier EthTxId is stored in the table IdData. It will allow the certified document reading process P3 to retrieve EncData and TemplateID. After executing step S2-13, the key vault table IdData is complete, with all required data.

An example of the key vault table IdData, as a json-type file, is shown in FIG. 6. As visible in FIG. 6, the key vault table IdData and a key vault of the permanent master key MK are associated with the blockchain account address KpubETH, the address KpubETH allowing an access path to the key vault of the master key MK.

In step S2-14, the process P2 has completed the certification and publication of the document and the web address, «URL=https//Reader/IdData||IK», of the certified document can be communicated to the recipient, for example, in the form of a QR code (acronym of «Quick Response Code").

Figure 5:
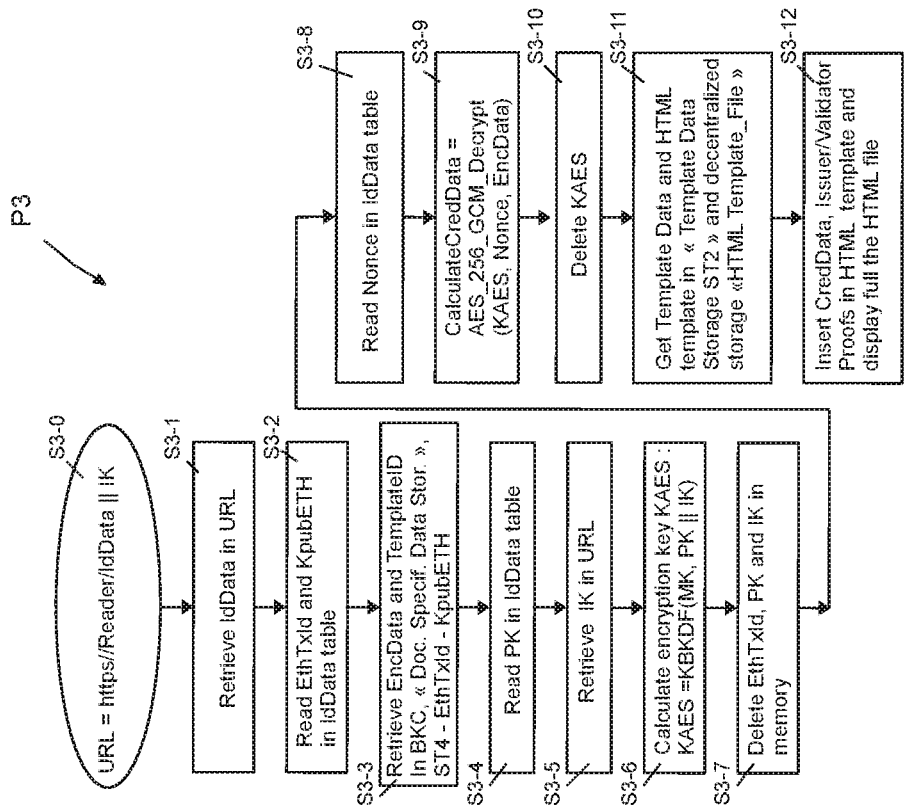
FIG. 5 is a non-limiting example function algorithm of a certified document reading process implemented in the computer-based method of the invention.

Referring now more particularly to FIGS. 3 and 5, the certified document reading process P3 is implemented by the certified document reading web application REA. The process P3 is designed to display a certified document which is accessible through the web address «URL=https//Reader/IdData||IK» as input. For that, the process P3 must retrieve the document specific data CredData from the encrypted data EncData registered in the blockchain BKC and the files HTML_Template and Template_Def using the identifier TemplateID registered in the blockchain BKC. Proofs of issuer and/or validator authenticity will also have to be retrieved from the validator storage ST0 and the issuer storage ST1 (FIG. 6) in the blockchain BKC.

FIG. 5 completes the simplified block diagram of FIG. 3, by showing in detail different processing steps S3-0 to S3-12 performed by the process P3.

At step S3-0, the user through his internet browser and the web address «URL=https//Reader/IdData||IK» connects to the server hosting the web application REA. The web application REA implements the certified document reading process P3.

In step S3-1, the process P3 retrieves the identifier of the table IdData from the web address «URL=https//Reader/IdData||IK».

In step S3-2, the transaction identifier EthTxId and the blockchain account address KpubETH are retrieved from the table IdData.

In step S3-3, the encrypted data EncData and the Template ID are retrieved in the blockchain BKC, in the document specific-data storage ST4, using the EthTxId identifier.

In steps S3-4 and S3-5, the persistence key PK is read in the table IdData and the intermediate key IK is retrieved from the web address «URL=https//Reader/IdData||IK», respectively.

In step S3-6, the encryption key KAES is calculated with the key derivation function $\partial$ of KBKDF type, KAES=KBKDF (MK, P||IK). The blockchain account address KpubETH allows an access path to the key vault of the permanent master key MK.

In step S3-7, the transaction identifier EthTxId and the keys PK and IK are erased in the working memory.

In step S3-8, the random data Nonce to be applied for decryption is read in the table IdData.

In step S3-9, the EncData, MK, IK and Nonce data are provided as inputs to the decryption algorithm, AES_256_GCM_Decrypt, which outputs the document specific data CredData, in clear text. The encryption key KAES is then erased from the working memory at step S3-10.

In step S3-11, the blockchain account address KpubETH and the identifier TemplateID provide an access to the data storage ST0, ST1, and ST2 (FIG. 6) in the blockchain BKC.

The web address URL_HTML_Template of the HTML_Template file and the Template_Def file are retrieved from the data storage ST2, using the identifier TemplateID. The web address URL_HTML_Template provides an access to the HTML_Template file that is stored, for example, in a server of a cloud service provider (FIG. 6, SRC, CSP). Note that one or more style definition files of type CSS (acronym of «Cascading Style Sheets") may be associated with the HTML_Template file.

The validator data storage ST0 and the issuer data storage ST1 are accessible with the IssuerID and ValidatorID identifiers and proofs of issuer and/or validator authenticity can be retrieved.

In step S3-12, the process P3 uses the document specific data CredData, the HTML_Template file, and other data retrieved from the data storage SC0-SC2 to form a complete HTML file that corresponds to the certified document. The process P3 ends its operations with a display of the complete HTML file of the certified document on the screen of the computer device of the user.

Figure 7:
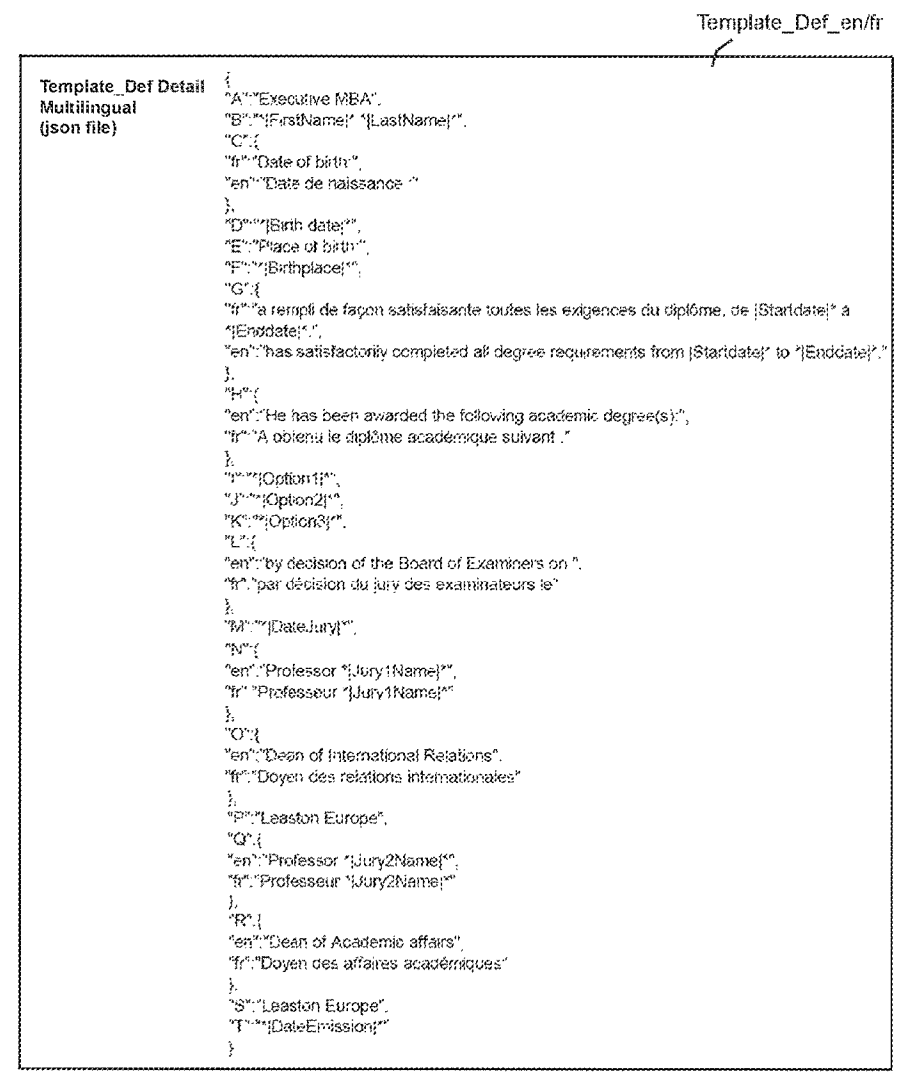
Figure 8:
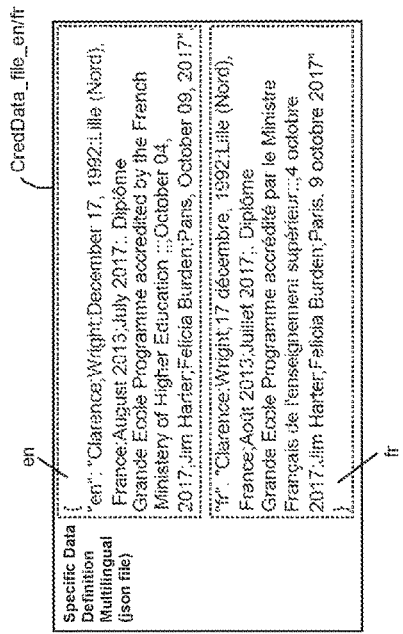

In other example embodiments of the invention, the certified documents may be displayed in multiple languages. FIGS. 7 and 8 show examples of bilingual files Template_Def_en/fr and CredData_file_en/fr for a display in English (en) and in French (fr) of a document. For example, several HTML template files in different languages can be provided, each template including data in its corresponding language. Or, only one multilingual template can be used, for example, in the case of two languages. According to the embodiments, one or more web addresses URL(s) of a multilingual certified document will be communicated to the user. In the case of multiple web addresses URLs, each web address URL could correspond to the certified document in one language. Preferably, only one web address URL will be communicated to the user for access to the entire multilingual certified document.

Figure 9:
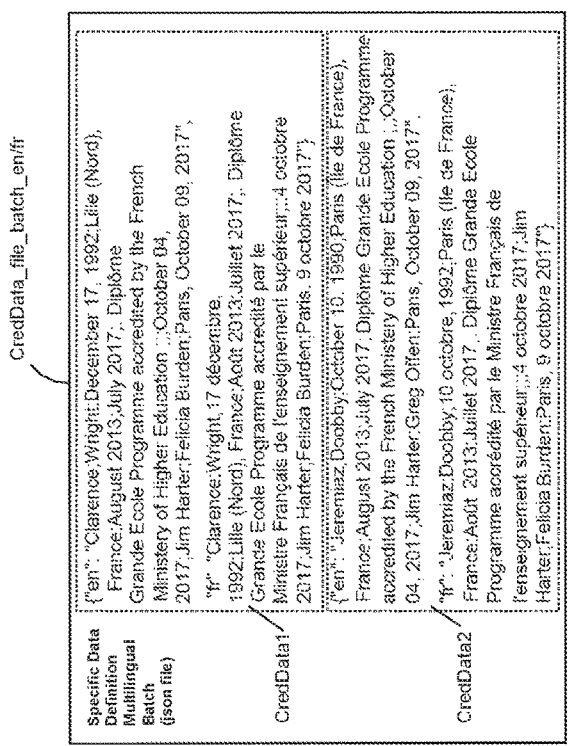

In other example embodiments of the invention, a certified document specific data file, CredData_file, may be formed, for encryption and registration in the blockchain, with a batch of plural document specific data sets, CredData1, CredData2, . . . , corresponding to plural certified documents, respectively. This implementation is advantageous in reducing the number of transactions with the blockchain and the volume of registered data, and the economic costs is reduced thereby. A compression of the file CredData_file will further reduce costs. FIG. 9 shows an example, CredData_file_batch_en/fr, of such a file. This text file includes a batch of two sets CredData1, CredData2, of bilingual document specific data, in English (en) and in French (fr).

In the above description of various non-limiting example embodiments of the present invention, whenever it is described that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this description, and variations thereof, unless otherwise expressly stated, should be construed as open-ended rather than limiting. As examples of the foregoing: "and/or" includes any and all combinations of one or more of the associated listed items; the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

Although process steps, algorithms or the like may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously, or in parallel, despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various non-limiting example embodiments have been shown and described in detail, the claims are not limited to any particular embodiment or example. None of the above description should be read as implying that any particular element, step or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention.

What is claimed is:

1. A computer-based method implemented in a document certification computer system deployed through the internet network and which interacts with a public blockchain, said document certification computer system having hardware and software resources located in at least one computer server and which are accessible through said internet network, said document certification computer system communicating via electronic data messages with at least one document issuer computer system through which a document issuer manages issuances of certified documents and at least one validator computer system through which a validator manages access rights and resources allocated to a document issuer account of said document issuer, said computer-based method comprising:

generating an issuer permanent master key which is assigned to said document issuer account and stored in a first key vault, certifying and publishing a document through an execution of a first process including generating a document persistence key which is assigned to said document and stored in a second key vault, rights to permanently erase said document persistence key being assigned to said document issuer account, encrypting document data with an encryption algorithm and an encryption key which is calculated by a key derivation function from said issuer permanent master key, said document persistence key and an intermediate key which is generated and assigned to said document, registering information including encrypted document data in said blockchain, and generating a document web address of a corresponding published certified document, said web address carrying recovery information of said document intermediate key and identification data of said published certified document, reading said published certified document through an execution of a second process which is accessible to said web address, said second process including recovering, from said identification data, said encrypted document data in said information registered in said blockchain and an access to said first and second key vaults, calculating said encryption key with said key derivation function from said issuer permanent master key, said document persistence key and said intermediate key recovered from said web address, decrypting said encrypted document data using said encryption key and displaying said certified document using said decrypted document data, and upon request from a legitimate holder of said published certified document, claiming a right to be forgotten, operating from said document issuer account a permanent erasure of said document persistence key, thereby rendering inoperative the execution of said second process and a display of said published certified document in said internet network.

2. The computer-based method of claim 1, wherein said first key vault is implemented in a hardware security module.

3. The computer-based method of claim 1, wherein said first and second key vaults are implemented in a hardware security module.

4. The computer-based method of claim 1, wherein said encryption algorithm is an encryption algorithm of AES type, said encryption key being symmetric and having a length of 256 bits.

5. The computer-based method of claim 4, wherein said encryption algorithm operates in a counter mode of GCM type.

6. The computer-based method of claim 1, wherein said key derivation function is a key derivation function of KBKDF type.

7. The computer-based method of claim 1, wherein:
said document data comprises predetermined specific data, said predetermined specific data being variable data in a document category to which pertains said document, and said first process further includes associating with said predetermined specific data a template identifier of a HTML template corresponding to said document category and including said template identifier in said information registered in said blockchain, and said second process further includes recovering said template identifier in said information registered in said blockchain from said identification data and displaying said certified document using said decrypted document data and said HTML template recovered using said template identifier.

8. The computer-based method of claim 7, wherein said second process further includes recovering authenticity proofs of said issuer and/or validator, said authenticity proofs having been previously registered in data storage in said blockchain and being localized using at least said identification data, and displaying said certified document using said authenticity proofs.

9. The computer-based method of claim 8, wherein said document data are in the form a text file, said text file includes a batch of plural said predetermined specific data arranged in a predetermined manner and pertaining respectively to plural documents.

10. The computer-based method of claim 9, wherein said predetermined specific data are written in one or plural languages.

11. The computer-based method of claim 10, comprising generating at least one document web address corresponding to one certified document published in plural languages.

12. A document certification computer system deployed through the internet network and which interacts with a public blockchain, said document certification computer system having hardware and software resources located in at least one computer server and which are accessible through said internet network, said document certification computer system communicating via electronic data messages with at least one document issuer computer system through which a document issuer manages issuances of certified documents and at least one validator computer system through which a validator manages access rights and resources allocated to a document issuer account of said document issuer, said computer server comprising a processor, non-volatile and volatile work memories and being coupled to electronic data storage and at least a network interface, where the processor is configured to perform:
generating an issuer permanent master key which is assigned to said document issuer account and stored in a first key vault, certifying and publishing a document through an execution of a first process including generating a document persistence key which is assigned to said document and stored in a second key vault, rights to permanently erase said document persistence key being assigned to said document issuer account, encrypting document data with an encryption algorithm and an encryption key which is calculated by a key derivation function from said issuer permanent master key, said document persistence key and an intermediate key which is generated and assigned to said document, registering information including encrypted document data in said blockchain, and generating a document web address of a corresponding published certified document, said web address carrying recovery information of said document intermediate key and identification data of said published certified document, reading said published certified document through an execution of a second process which is accessible to said web address, said second process including recovering, from said identification data, said encrypted document data in said information registered in said blockchain and an access to said first and second key vaults, calculating said encryption key with said key derivation function from said issuer permanent master key, said document persistence key and said intermediate key recovered from said web address, decrypting said encrypted document data using said encryption key and displaying said certified document using said decrypted document data, and upon request from a legitimate holder of said published certified document, claiming a right to be forgotten, operating from said document issuer account a permanent erasure of said document persistence key, thereby rendering inoperative the execution of said second process and a display of said published certified document in said internet network.

13. The document certification computer system of claim 12, wherein said computer server comprises a hardware security module which is coupled to said hardware processor, at least said first key vault being implemented in said hardware security module.

14. The document certification computer system of claim 13, wherein said encryption algorithm is an encryption algorithm of AES type, said encryption key being symmetric and having a length of 256 bits.

15. The document certification computer system of claim 14, wherein said encryption algorithm operates in a counter mode of GCM type.

16. The document certification computer system 15, wherein said key derivation function is a key derivation function of KBKDF type.

17. The document certification computer system of claim 12, wherein:
said document data comprises predetermined specific data, said predetermined specific data being variable data in a document category to which pertains said document, and said first process further includes associating with said predetermined specific data a template identifier of a HTML template corresponding to said document category and including said template identifier in said information registered in said blockchain, and said second process further includes recovering said template identifier in said information registered in said blockchain from said identification data and displaying said certified document using said decrypted document data and said HTML template recovered using said template identifier.

18. The document certification computer system of claim 17, wherein said second process further includes recovering authenticity proofs of said issuer and/or validator, said authenticity proofs having been previously registered in data storage in said blockchain and being localized using at least said identification data, and displaying said certified document using said authenticity proofs.

19. The document certification computer system of claim 18, wherein said document data are in the form a text file, said text file includes a batch of plural said predetermined specific data arranged in a predetermined manner and pertaining respectively to plural documents.

* * * * *